United States Patent
Kobayakawa et al.

(10) Patent No.: US 8,888,370 B2
(45) Date of Patent: Nov. 18, 2014

(54) SLIDE BEARING

(71) Applicant: Daido Metal Company Ltd., Aichi (JP)

(72) Inventors: Hiroki Kobayakawa, Aichi (JP); Naohisa Kawakami, Aichi (JP); Moritaka Fukuda, Aichi (JP)

(73) Assignee: Daido Metal Company Ltd., Nagoya-Shi (JP)

( * ) Notice: Subject to any disclaimer, the term of this patent is extended or adjusted under 35 U.S.C. 154(b) by 0 days.

(21) Appl. No.: 13/960,259

(22) Filed: Aug. 6, 2013

(65) Prior Publication Data
US 2014/0037236 A1    Feb. 6, 2014

(30) Foreign Application Priority Data

Aug. 6, 2012 (JP) ................................. 2012-174252

(51) Int. Cl.
| | |
|---|---|
| *F16C 33/02* | (2006.01) |
| *F16C 33/10* | (2006.01) |
| *F16C 33/20* | (2006.01) |
| *F16C 33/22* | (2006.01) |

(52) U.S. Cl.
CPC ............. *F16C 33/22* (2013.01); *F16C 33/1065* (2013.01); *F16C 2208/22* (2013.01); *F16C 2360/22* (2013.01); *F16C 2208/42* (2013.01); *F16C 2240/60* (2013.01); *F16C 33/201* (2013.01); *F16C 33/206* (2013.01); *F16C 2240/40* (2013.01)
USPC ........................................................ 384/276

(58) Field of Classification Search
CPC ........ F16C 17/02; F16C 33/22; F16C 33/201; F16C 33/206; F16C 2240/60; F16C 2360/22; F16C 2240/40; F16C 2208/22; F16C 2208/42
USPC .................................. 384/275, 276, 283, 294
See application file for complete search history.

(56) References Cited

U.S. PATENT DOCUMENTS 4,400,099 A * 8/1983 Ehrentraut ..................... 384/283
4,561,787 A * 12/1985 Ehrentraut et al. ........... 384/295

(Continued)

FOREIGN PATENT DOCUMENTS

| | | |
|---|---|---|
| CN | 202937643 U | 5/2013 |
| EP | 2541085 A1 | 1/2013 |

(Continued)

OTHER PUBLICATIONS

GB Search Report issued in connection with corresponding UK application on Feb. 5, 2014.

*Primary Examiner* — James Pilkington
(74) *Attorney, Agent, or Firm* — Browdy and Neimark, PLLC (57) ABSTRACT

A slide bearing for internal combustion engines includes a metal layer having an inner peripheral surface extending along at least a part of a cylindrical shape and a resin coating layer formed on the inner peripheral surface. The inner peripheral surface has annular or helical groove sections extending in a generally circumferential direction of a cylindrical shape such that the inner peripheral surface has protrusion sections, which are arranged adjacent to each other in an axial direction of the cylindrical shape and which extend in the generally circumferential direction. The resin coating layer matches the shapes of the groove sections and the protrusion sections. When t is average coating thickness of the resin coating layer at positions different from crests of the protrusion sections and Rpk is reduced peak height of the resin coating layer, t and Rpk satisfy the following relations: $1.0 \ \mu m \leq t \leq 5.0 \ \mu m$; and $0.06 \leq Rpk/t \leq 5.04$.

5 Claims, 4 Drawing Sheets

(56) References Cited

U.S. PATENT DOCUMENTS

| | | | |
|---|---|---|---|
| 5,620,262 A | | 4/1997 | Kumada et al. |
| 5,632,559 A | * | 5/1997 | Kumada et al. ............... 384/283 |
| 6,688,273 B2 | * | 2/2004 | Ederer ....................... 123/197.3 |
| RE38,791 E | * | 9/2005 | Shibata et al. ................ 384/120 |
| 7,059,290 B2 | | 6/2006 | Ishikawa et al. |
| 2003/0031389 A1 | | 2/2003 | Kayanama |
| 2006/0083451 A1 | | 4/2006 | Kawagoe |
| 2010/0319647 A1 | | 12/2010 | Ogawa |
| 2012/0275732 A1 | * | 11/2012 | Hanatatsu ..................... 384/276 |
| 2012/0308168 A1 | | 12/2012 | Watanabe |

FOREIGN PATENT DOCUMENTS

| | | |
|---|---|---|
| JP | 03183775 A | 8/1991 |
| JP | 3133209 | 2/2001 |
| JP | 2003-286895 | 10/2003 |
| JP | 2004-211859 | 7/2004 |
| JP | 4021607 | 12/2007 |
| JP | 2010-286038 | 12/2010 |
| JP | 2011-179566 | 9/2011 |
| WO | 2009/069703 | 6/2009 |

* cited by examiner

| Example No. | t (μm) | Rpk/t | Uniformity of coating thickness | Rsma-Rsmr (mm) | Rsma/3 | Δ (mm) | Scratch Resistance (MPa) | Amount of PA (vol.%) | MoS2 (vol.%) | Other (vol.%) | Friction Coefficient Stabilization Time (Hr) | Final Friction Coefficient |
|---|---|---|---|---|---|---|---|---|---|---|---|---|
| A-1 | 2.0 | 2.00 | ○ | 0.010 | 0.045 | 0.004 | 1000 | 5 | 40 | — | 1.0 | 0.00028 |
| A-2 | 4.5 | 0.10 | ○ | 0.008 | 0.052 | 0.003 | 1100 | 10 | 30 | — | 1.0 | 0.00042 |
| A-3 | 3.0 | 0.50 | ○ | 0.011 | 0.038 | 0.005 | 1000 | 10 | 35 | — | 1.5 | 0.00030 |
| A-4 | 2.5 | 0.21 | ○ | 0.007 | 0.048 | 0.003 | 1000 | 5 | 40 | Graphite:10 | 1.0 | 0.00020 |
| A-5 | 2.5 | 0.25 | ○ | 0.009 | 0.035 | 0.004 | 950 | 5 | 30 | CaCO3:15 | 1.5 | 0.00022 |
| A-6 | 5.0 | 0.08 | ○ | 0.043 | 0.053 | 0.018 | 850 | 5 | 50 | — | 2.5 | 0.00050 |
| A-7 | 1.0 | 0.12 | ○ | 0.009 | 0.055 | 0.004 | 800 | 18 | 40 | — | 2.0 | 0.00028 |
| A-8 | 1.2 | 5.00 | ○ | 0.012 | 0.048 | 0.005 | 1200 | 5 | 30 | — | 2.5 | 0.00030 |
| A-9 | 4.8 | 0.08 | ○ | 0.006 | 0.049 | 0.003 | 1050 | 3 | 40 | Fe2O3:15 | 2.5 | 0.00049 |
| A-10 | 1.5 | 0.24 | ○ | 0.005 | 0.037 | 0.002 | 700 | 25 | 15 | — | 3.5 | 0.00033 |
| A-11 | 2.5 | 2.30 | ○ | 0.025 | 0.049 | 0.011 | 2050 | 5 | 20 | — | 4.0 | 0.00040 |
| A-12 | 2.5 | 2.50 | × | 0.060 | 0.048 | 0.050 | 400 | 30 | 20 | — | 4.0 | 0.00042 |
| A-13 | 2.5 | 0.08 | ○ | 0.060 | 0.045 | 0.050 | 1850 | 1 | 25 | — | 3.5 | 0.00038 |
| B-1 | 5.0 | 0.05 | ○ | 0.020 | 0.038 | 0.004 | 950 | 5 | 30 | — | 4.5 | 0.00070 |
| B-2 | 7.0 | 0.22 | ○ | 0.015 | 0.032 | 0.005 | 950 | 15 | 20 | — | 5.0 | 0.00054 |
| B-3 | 6.0 | 0.24 | ○ | 0.009 | 0.035 | 0.002 | 700 | 20 | 35 | — | 4.5 | 0.00064 |
| B-4 | 2.5 | 5.20 | ○ | 0.007 | 0.054 | 0.006 | 800 | 10 | 40 | — | NOT STABILIZED | — |

FIG. 4

SLIDE BEARING

CROSS REFERENCE TO RELATED APPLICATIONS

This application claims priority based on Japanese patent application No. 2012-174252 filed Aug. 6, 2012, entirety of which is incorporated herein by reference.

TECHNICAL FIELD

The present invention relates to a slide bearing, and more specifically, relates to a slide bearing for an internal combustion engine.

BACKGROUND

A structure having a resin coating layer provided on an outermost surface of a bearing alloy layer is known to be effective as a structure for improving slide bearing characteristics. There is proposed a slide bearing as one example of the above structure (See Patent Document 1: JP-A-2004-211859), in which an overlay layer containing molybdenum disulfide ($MoS_2$) as a solid lubricant and a PAI resin (polyamide-imide resin) as a binder resin is formed on a flattened surface of the bearing alloy layer. The overlay layer has a helical groove and annular projections formed, as a recess-and-protrusion shape, on the surface thereof. In the slide bearing, the regularly-formed recess-and-protrusion shape on the surface of the overlay layer can maintain lubricating oil in the recess parts of the recess-and-protrusion shape. Therefore, improvement of seizure resistance can be expected.

The slide bearing described in Patent Document 1 is intended to improve its conformability to a rotation shaft through plastic deformation of the overlay layer (see paragraph 0006 of Patent Document 1). However, it can be difficult for the overlay layer to be plastically deformed because the overlay layer is made of a synthetic resin and has high elasticity. Therefore, it can take a long time before the conformity is achieved. It may be also assumed that abrasion of the overlay layer achieves the conformity to the rotation shaft. However, it can take a long time before adequate conformity is achieved by the abrasion of the overlay layer because the synthetic resin that constitutes the overlay layer has a low friction property.

Examples of techniques focusing on the above problem include a technique described in Patent Document 2: JP-A-2011-179566. In the technique, the slide bearing has a bearing alloy layer having annular grooves and crests formed thereon and has an overlay layer made of a low-friction synthetic resin that covers a surface of the bearing alloy layer. The surface of the overlay layer is formed as a recess-and-protrusion surface to match a recess-and-protrusion surface of the bearing alloy layer. Because the crests are provided to the bearing alloy layer as above, the crests of the bearing alloy layer are expected to be plastically deformed when a load is applied to the slide bearing from the rotation shaft. The above structure is intended to expedite the conformity of the bearing to the rotation shaft even in a configuration using the overlay layer made of a low-friction synthetic resin. In an experimental example described in Patent Document 2, the crests of the bearing alloy layer result in the plastic deformation despite the presence of the overlay layer made of the low-friction synthetic resin (see paragraph 0012 and FIG. 2 of Patent Document 2).

However, an experimental example described in Patent Document 2 assumes a condition that bearing contact pressure is 84 MPa (50 MPa in FIG. 3), which is close to limit contact pressure performance of general aluminum bearings. The experimental example assumes the experimental condition that includes very high contact pressure compared with contact pressure (about 10 to 20 MPa) generated in an actual use environment of internal combustion engines. Although the crests of the bearing alloy layer may be plastically deformed under the very high contact pressure, it is thought that the bearing alloy layer crest cannot be plastically deformed, as intended, under the actual general use environment (contact pressure about 10 to 20 MPa) when the bearing is applied to the internal combustion engine. Therefore, it is considered to be difficult to achieve the conformity within a short period of time under the actual general use environment.

SUMMARY

The present invention is made to solve the above problems, and an object of the present invention is to provide a slide bearing for an internal combustion engine capable of achieving conformity within a short period of time through appropriate abrasion of a resin coating layer.

Inventors of the present invention have diligently studied to solve the above problem, and have thought of each aspect of the present invention as follows.

That is, according to a first aspect of the present invention, a slide bearing for an internal combustion engine includes:

a metal layer having an inner peripheral surface formed to extend along at least a part of a cylindrical shape; and a resin coating layer formed on the inner peripheral surface of the metal layer, wherein:

the inner peripheral surface of the metal layer has annular or helical groove sections that extend in a generally circumferential direction of the cylindrical shape such that the inner peripheral surface has protrusion sections, which are arranged adjacent to each other in an axial direction of the cylindrical shape and which extend in the generally circumferential direction;

the resin coating layer is formed to match shapes of the groove sections and the protrusion sections; and t and Rpk satisfy the following relations:

$$1.0 \text{ μm} \leq t \leq 5.0 \text{ μm; and}$$

$$0.06 \leq Rpk/t \leq 5.04,$$

where t is an average coating thickness of the resin coating layer at positions different from crests of the protrusion sections; and Rpk is a reduced peak height of the resin coating layer.

When the average coating thickness of the resin coating layer of the slide bearing and the ratio of the reduced peak height to the average coating thickness are set to fall within the respective value ranges as above, it is possible to appropriately control a time required for the initial abrasion of the resin coating layer especially near the crests of protrusion sections of the metal layer even in a case where the resin coating layer is made of a resin material having a low friction property. That is, with the above configuration, even in a case where the resin coating layer is made of a resin material having a low friction property, the resin coating layer is more likely to be subjected to abrasion near the crests of the protrusion sections of the metal layer, thereby completing the conformity (initial conformity) within a short period of time. Also, the slide bearing for the internal combustion engine according to the present invention can complete the conformity within a short period of time because of the appropriate abrasion of the resin coating layer even under general use environment that is different from particular environment generating the very high contact pressure (equal to or greater than 50 MPa) as in the experimental example described in Patent Document 2. In the above, the general use environment includes a situation where normal contact pressure (about 10 to 20 MPa), which can occur during actual use in the internal combustion engine, is generated and the bearing alloy layer crest covered by the resin coating layer is unlikely to be plastically deformed. Thus, it is possible to provide a preferable solution for the problematic situation where the slide bearing having the resin coating layer requires a long time for achieving conformity.

Note that, "completing the conformity" indicates that a friction coefficient of the slide bearing to the rotation shaft reaches a saturation level, from which the friction coefficient does not change largely, for example, during the observation of the change of the friction coefficient with time.

In terms of a phrase "positions different from crests of the protrusion sections", for example, the positions different from crests of the protrusion sections of the bearing alloy layer may correspond to positions located outside a range of 15 µm on each of both sides from crest positions of the protrusion sections of the bearing alloy layer in the axial direction when observed in a cross section taken along the axial direction of the cylindrical shape.

In the present application, the internal combustion engine is not limited to one employed for a private automobile. The above configuration can achieve similar effects also in the case of large-diameter bearings employed for internal combustion engines of ships or large vehicles such as busses and trucks.

Also, due to the conformity, the metal layer having a high thermal conductivity can be partially exposed, and the resin coating layer having a low thermal conductivity becomes thinner. As a result, a heat dissipation property of an entirety of the slide bearing improves, whereby seizure resistance improves advantageously.

According to a second aspect of the present invention, the average coating thickness t and the reduced peak height Rpk of the resin coating layer satisfy the following relations:

$$2.0 \ \mu m \leq t \leq 4.5 \ \mu m; \text{ and}$$

$$0.1 \leq Rpk/t \leq 2.0.$$

With the above configuration, it is possible to preferably provide a more preferable effect of achieving the conformity within a short period of time.

According to a third aspect of the present invention, T, t and σ satisfy the following relation:

$$t-2\sigma \leq T \leq t+2\sigma,$$

where σ is a standard deviation of coating thicknesses of the resin coating layer measured at the positions different from the crests of the protrusion sections; and
T is an actual measurement value of the coating thickness;
Rsma and Rsmr satisfy the following relation:

$$|Rsma-Rsmr| \leq 0.05 \ mm,$$

where Rsma is an average length measured between the adjacent protrusion sections on the inner peripheral surface of the metal layer; and
Rsmr is an average length measured between corresponding adjacent protrusion sections of the resin coating layer, which correspond to the protrusion sections of the metal layer; and
Rsma and Δ satisfy the following relation:

$$\Delta \leq Rsma/3,$$

where Δ is a distance measured along the axial direction between one of the protrusion sections on the inner peripheral surface of the metal layer and a corresponding one of the protrusion sections of the resin coating layer, the corresponding one being positioned most closely to the one of the protrusion sections of the metal layer.

As above, the coating thickness of the resin coating layer is generally uniformed, and also pitches and phases of the recess-and-protrusion shape of the metal layer and the recess-and-protrusion shape of the resin coating layer are generally matched respectively. Therefore, it is possible to accurately conform the surface shape of the recess and protrusion of the resin coating layer to the surface shape of the recess and protrusion of metal layer, i.e., it is possible to approximate the surface shape of the resin coating layer to the surface shape of the metal layer. Due to the above, it is possible to suppress elastic deformation of the resin coating layer, and thereby the resin coating layer is more likely to be subjected to abrasion for the initial conformity. As a result, the time required for the conformity can be advantageously shortened.

According to a fourth aspect of the present invention, the resin coating layer has a scratch resistance in a range of 500 MPa to 2000 MPa. By employing the resin coating layer having the scratch resistance within the above value range, abrasion for the initial conformity is more likely to occur, and thereby the time required for the conformity can be advantageously shortened. Note that, the scratch resistance will be described later.

According to a fifth aspect of the present invention, the resin coating layer contains a base resin and a solid lubricant;
the base resin contains polyamide-imide and polyamide that corresponds to 2 to 20% of the polyamide-imide by volume;
the solid lubricant contains one or more of molybdenum disulfide, tungsten disulfide, boron nitride, and graphite; and
the solid lubricant, in total, corresponds to 20 to 60% of an entirety of the resin coating layer by volume.

As above, by adding the polyamide (PA), which corresponds to 2 to 20% of the polyamide-imide (PAI) by volume, to the polyamide-imide, it is possible to properly define elongation characteristics of the resin coating layer. Also, by adding the solid lubricant to the resin coating layer such that the solid lubricant corresponds to 20 to 60% of the entire resin coating layer by volume, it is possible to achieve reduction in the friction coefficient, thereby suppressing a rise in temperature. As a result, it is possible to suppress the occurrence of seizure phenomena.

BRIEF DESCRIPTION OF DRAWINGS

These and other objectives and technical advantages of the present invention will be apparent from the following description of the exemplary embodiments of the invention in conjunction with the accompanying drawings, in which:

FIGS. 1(A) and 1(B) are schematic enlarged views illustrating a cross section of a slide bearing for an internal combustion engine according to one embodiment of the present invention, the cross section being taken along an axial direction of the slide bearing. FIG. 1(A) illustrates a state before initial conformity of the slide bearing, and FIG. 1(B) illustrates a state after completion of the initial conformity;

FIGS. 2(A) to 2(C) are schematic diagrams illustrating relation between a surface shape of a bearing alloy layer and a surface shape of a resin coating layer of the slide bearing according to the embodiment. FIG. 2(A) illustrates a method of measuring a coating thickness of the resin coating layer on the surface of the bearing alloy layer. FIG. 2(B) illustrates relation between lengths measured between protrusion sections formed on the surface of the bearing alloy layer and lengths measured between protrusion sections formed on the surface of the resin coating layer. FIG. 2(C) illustrates deviation between the protrusion sections formed on the surface of the bearing alloy layer and the protrusion sections formed on the surface of the resin coating layer;

DETAILED DESCRIPTION

A slide bearing for an internal combustion engine according to one embodiment of the present invention will be described below with reference to FIGS. 1(A) and 1(B).

Figure 1:
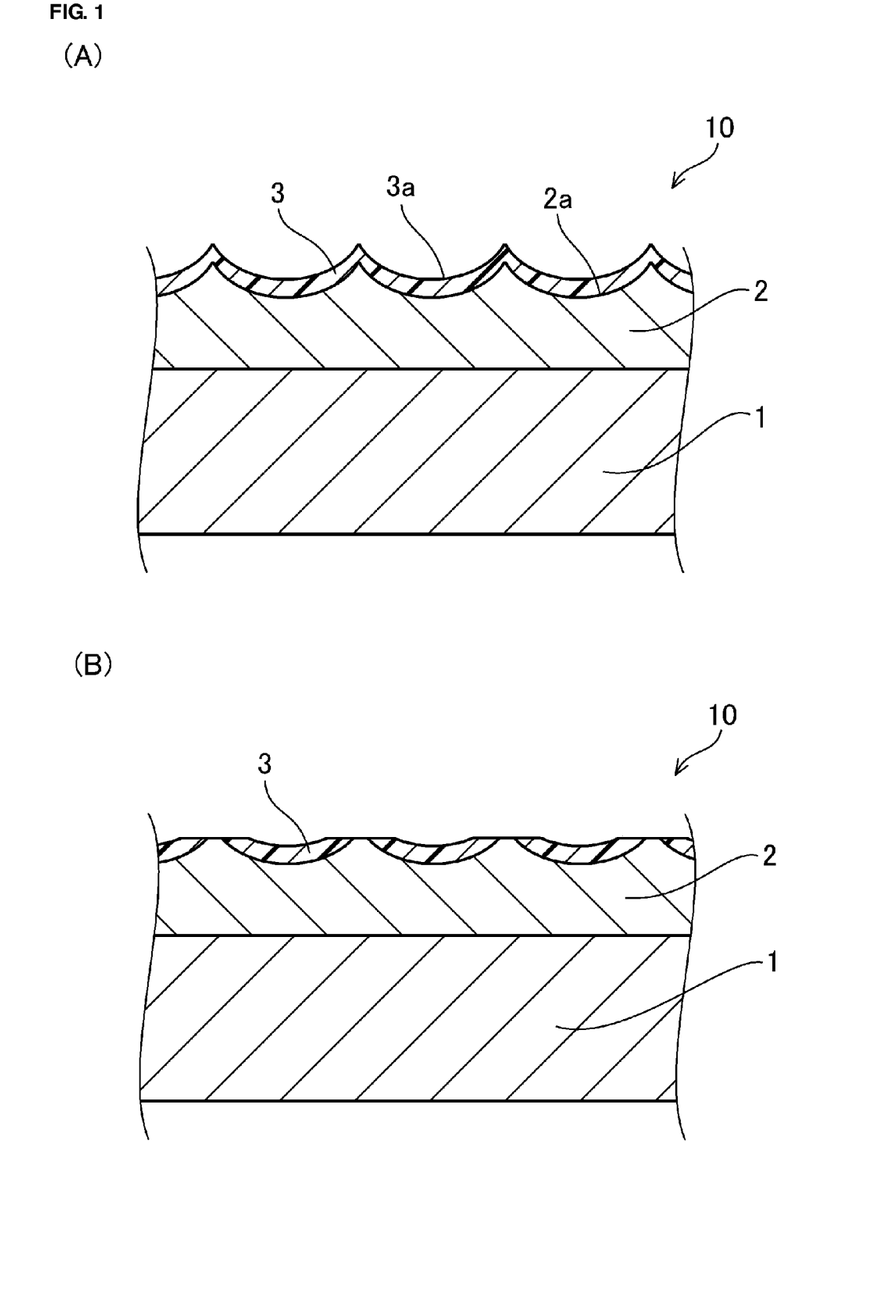

FIG. 1(A) is a schematic view illustrating a partial enlarged cross section of a slide bearing 10 in the shape of a cylinder or a halved cylinder according to the present embodiment, the cross section being taken along an axial direction of the slide bearing 10. As illustrated, the slide bearing 10 of the present embodiment has a bearing alloy layer 2 (metal layer), which is made of an aluminum alloy and is pressure-welded to a surface of a backing metal layer 1. The aluminum alloy that constitutes the bearing alloy layer 2 preferably has Vickers hardness equal to or greater than 30. The bearing alloy layer 2 has annular or helical groove sections formed on an inner peripheral surface thereof, i.e., a surface of the bearing alloy layer 2 opposite from the backing metal layer 1. The groove sections extend in a generally circumferential direction of the cylindrical shape. As a result, projections formed between the groove sections adjacent to each other in the axial direction provide annular or helical consecutive protrusion sections that extend in the generally circumferential direction. Furthermore, the surface of the bearing alloy layer 2 is covered with a resin coating layer 3. The surface of the resin coating layer 3 has recesses and protrusions in accordance with the recesses and protrusions formed on the surface of the bearing alloy layer 2. Note that, a dimensional ratio in the drawings is different from that of the actual slide bearing, and a dimension in the axial direction is compressed.

Thus, the slide bearing 10 having the above configuration has the regular groove sections formed on the surface of the resin coating layer 3. Accordingly, lubricating oil can be evenly distributed on an inner peripheral surface of the slide bearing 10 by introducing the lubricating oil into the groove sections. As a result, even when a rotation shaft (not shown) fitted on the inner peripheral side of the slide bearing 10 rotates at high speed, it is possible to mitigate the rise in temperature of the slide bearing 10, thereby providing excellent seizure resistance.

In the slide bearing 10 of the present embodiment, an average coating thickness of the resin coating layer 3 and a ratio of a reduced peak height of the resin coating layer 3 to the average coating thickness are defined in details in order to expedite the achievement of the conformity (i.e., shape conformity or initial conformity) of the slide bearing 10 to the rotation shaft through abrasion of the resin coating layer 3 (and abrasion of the bearing alloy layer 2 in some cases).

Figure 2:
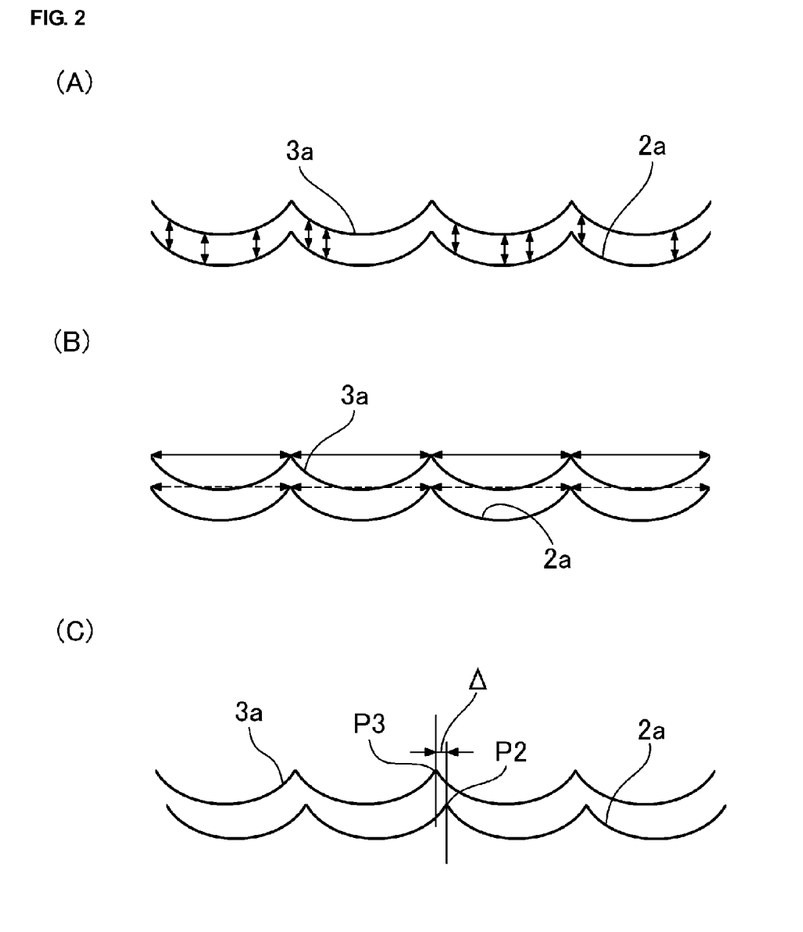

More specifically, in the slide bearing 10 of the present embodiment, when average coating thickness t is defined as an average value of coating thicknesses of the resin coating layer 3 measured at positions different from crests of the protrusion sections of the bearing alloy layer 2, the resin coating layer 3 is formed such that the average coating thickness t is in a range from 1.0 μm to 5.0 μm (1.0 μm≤t≤5.0 μm). For example, as illustrated by lines with arrows on both ends in FIG. 2(A), the average coating thickness t is an average value of coating thicknesses at 10 points of the resin coating layer 3 located at positions different from the crests of the protrusion sections of the bearing alloy layer 2. Note that, FIG. 2(A) is a diagram schematically illustrating a positional relationship between a surface 2a of the bearing alloy layer 2 and a surface 3a of the resin coating layer 3 in the cross-sectional view in FIG. 1(A).

Note that, in the present embodiment, the positions different from the crests of the protrusion sections of the bearing alloy layer 2 correspond to positions located outside a range of 15 μm on each of both sides from the crest positions of the protrusion sections of the bearing alloy layer 2 in the axial direction when observed in a cross section taken along the axial direction. Each measurement is conducted under such the definition.

Further, the slide bearing 10 of the present embodiment is formed such that a ratio of a reduced peak height Rpk based on JIS B0671-2 (i.e., ISO 13565-2: 1996) to the average coating thickness t of the resin coating layer 3 is in a range from 0.06 to 5.04 (0.06≤Rpk/t≤5.04).

With the above configuration, parts of the resin coating layer 3 located near the crests of the protrusion sections of the bearing alloy layer 2 become more likely to be subjected to abrasion due to friction with the rotation shaft during the rotation of the rotation shaft. As a result, conformity of the slide bearing 10 to the rotation shaft is completed within a short period of time. Note that, "completing the conformity" indicates that a friction coefficient of the slide bearing 10 to the rotation shaft reaches a saturation level at an initial stage of the use of the slide bearing 10, for example, while the change of the friction coefficient with time is observed. FIG. 1(B) is a schematic view illustrating one example of a cross section of the slide bearing 10 that has completed the conformity. In the present example, in addition to the parts of the resin coating layer 3 near the crests of the protrusion sections of the bearing alloy layer 2, the crest parts of the protrusion sections of the bearing alloy layer 2 have also been worn when the initial conformity is completed.

After the conformity is completed, oil is readily drawn to a space between the rotation shaft and the slide bearing, and thereby an oil film is easily formable. As a result, a low friction coefficient is achievable. If the resin coating layer 3 that is highly deformable elastically remains on the surface of the slide bearing 10 with substantial amount and thickness when the conformity is completed, the formed oil film may have an uneven thickness depending on positions due to the elastic deformation of the resin coating layer 3. Thereby, the friction coefficient may be unsteady and may remain high. In contrast, in the slide bearing 10 of the present embodiment, after the conformity is completed, parts of the metal surface of the bearing alloy layer 2 can be exposed such that the inner peripheral surface of the slide bearing 10 has a mixed structure of the metal and the resin. As for the resin coating layer 3 remaining on the inner peripheral surface when the conformity is completed, only thin resin coating layer 3 remains there. Consequently, it is possible to suppress the influence of the elastic deformation of the resin coating layer 3. In other words, the oil film thickness is stabilized, and the friction coefficient is lowered.

As above, parts of the bearing alloy layer 2, which has a high thermal conductivity, may be exposed due to the shape conformity and the resin coating layer 3, which has a low thermal conductivity, becomes thinner. As a result, the heat dissipation property of the entirety of the slide bearing 10 improves, and thereby the seizure resistance is improved.

In the slide bearing 10 of the present embodiment, the abrasion of the resin coating layer 3 gradually progresses from crests of the protrusion sections of the resin coating layer 3 and areas neighboring the crests when the conformity takes place. Therefore, even in a case where a part of the bearing alloy layer 2 becomes exposed, the exposed area gradually enlarges from a very narrow area. As a result, the lubricating oil invariably exists between the exposed bearing alloy layer 2 and the metal of the rotation shaft, and therefore metals do not suddenly and directly contact each other at broad areas of the metals. Consequently, it is possible to effectively suppress the occurrence of seizure caused by the contact of the metals.

According to tests conducted by the inventors, it has been found out that the initial conformity due to the abrasion can be completed within a short period of time when the value of Rpk/t is less than 0.06. However, such the configuration does not contribute to the reduction in the friction coefficient and the improvement of the seizure resistance after the conformity is achieved. In contrast, when the value of Rpk/t is greater than 5.04, the friction coefficient can be deceased and the seizure resistance can be improved after the conformity is achieved. However, such the configuration does not expedite the initial conformity due to the abrasion under general use environment.

Further, the average coating thickness t of the resin coating layer 3 should be preferably in a range from 2.0 μm to 4.5 μm (2.0 μm≤t≤4.5 μm), and the ratio of the reduced peak height Rpk of the resin coating layer 3 to the average coating thickness t should be preferably in a range from 0.1 to 2.0 (0.1≤Rpk/t≤2.0). Thus, it is possible to exert the above effects more preferably.

Also, it is preferable that the coating thickness of the resin coating layer 3 is generally formed uniformly at the positions different from the crests of the protrusion sections of the bearing alloy layer 2. More specifically, an actual measurement value T of the above coating thickness should preferably fall within a range as follows: t−2σ≤T≤t+2σ, wherein σ indicates a standard deviation of the measurement value of the above coating thickness.

Further, it is preferable that difference between Rsma and Rsmr is equal to or less than 0.05 mm (|Rsma−Rsmr|≤0.05 mm), wherein Rsma indicates an average value of lengths (indicated by dashed lines with arrows on both ends in FIG. 2(B)) measured between the adjacent protrusion sections of the bearing alloy layer 2, and Rsmr indicates an average value of lengths (indicated by solid lines with arrows on both ends in FIG. 2(B)) measured between the adjacent protrusion sections of the resin coating layer 3 corresponding to the protrusion sections of the bearing alloy layer 2. In other words, a pitch of the recess-and-protrusion shape of the bearing alloy layer 2 should be preferably generally equal to a pitch of the recess-and-protrusion shape of the resin coating layer 3.

Further, it is preferable that a distance Δ is equal to or less than one third of the average length Rsma measured between the adjacent protrusion sections of the bearing alloy layer 2 (Δ≤Rsma/3), wherein the distance Δ is measured in an axial direction between a protrusion section of the bearing alloy layer 2 (for example, crest P2 in FIG. 2(C)) and the closest protrusion section of the resin coating layer 3 (for example, crest P3 in FIG. 2(C)). In other words, it is preferable that difference between a phase of the recess-and-protrusion shape of the bearing alloy layer 2 and a phase of the recess-and-protrusion shape of the resin coating layer 3 is small.

As above, the coating thickness of the resin coating layer 3 is generally uniformed, and the pitches and the phases of the recess-and-protrusion shape of the bearing alloy layer 2 and the recess-and-protrusion shape of the resin coating layer 3 are generally matched. Thereby, it is possible to accurately conform (or approximate) the surface shape of the resin coating layer 3 to the surface shape of the bearing alloy layer 2. Due to the above, it is possible to suppress elastic deformation of the resin coating layer 3 and to enhance the abrasion of the resin coating layer 3 for the initial conformity. Consequently, it is advantageously possible to shorten the time required to complete the conformity even under a general use environment.

Further, a scratch resistance of the resin coating layer 3 should preferably fall within a range of 500 MPa to 2000 MPa. In the above, the scratch resistance indicates a degree of resistance at the time when the resin coating layer 3 is scratched by a conical diamond indenter and corresponds to a value calculated by dividing a frictional force by a projected area of indentation on the resin coating layer 3 made by the indenter. Because the resin coating layer 3 having the scratch resistance within the above value range is used for coating, the abrasion of the resin coating layer 3 is more likely to occur for the initial conformity. As a result, it is advantageously possible to shorten the time required to complete the conformity.

The resin coating layer 3 should preferably contain a base resin and a solid lubricant. The base resin should preferably contain a polyamide-imide (PAI) and a polyamide (PA) that corresponds to 2 to 20% of the polyamide-imide by volume. The solid lubricant should preferably contain one or more of molybdenum disulfide, tungsten disulfide, boron nitride, and graphite and correspond, in total, to 20 to 60% of the entirety of the resin coating layer 3 by volume.

As above, by adding the polyamide, which corresponds to 2 to 20% of the polyamide-imide by volume, to the polyamide-imide, it is possible to properly define the elongation characteristics of the resin coating layer 3. Also, by adding the solid lubricant to the resin coating layer 3 such that the solid lubricant corresponds to 20 to 60% of the entire resin coating layer 3 by volume, it is possible to further decrease the friction coefficient and suppress the rise in temperature during the rotation of the rotation shaft. Thereby, it is possible to suppress the occurrence of the seizure phenomena.

Figure 3:
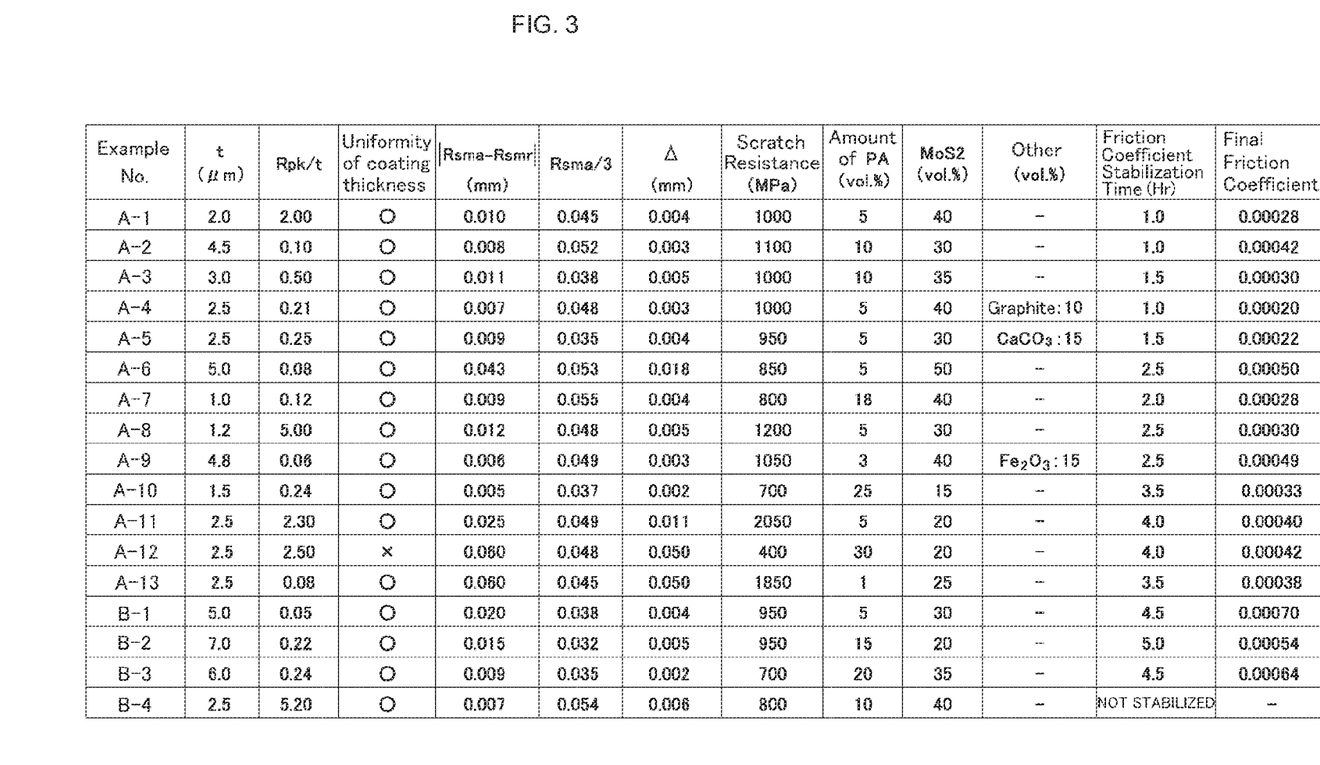
FIG. 3 is a table illustrating experimental results of the initial conformity of the slide bearing for the internal combustion engine according to multiple embodiment examples of the present invention and further illustrating experimental results of comparison examples.

FIG. 3 is a table indicating results of a test conducted by the inventors of the present invention for measuring a friction coefficient stabilization time and a final friction coefficient, as indexes indicating the conformability of the slide bearing 10, under various conditions.

Samples of the slide bearing 10 employed in the present test are prepared as follows. Firstly, the aluminum-alloy bearing alloy layer 2 is pressure-welded to the backing metal layer 1, and the resulting work is processed into a halved-cylinder shape. The inner surfaces of the samples in the shape of halved cylinders are finished with various degrees of roughness. Then, a spraying method is used to form a layer, which contains a resin as a main component and corresponds to the resin coating layer 3, with various coating thicknesses. Then, the work is burned for about 1 hour at 200° C. to obtain the test sample.

Thus, as shown in FIG. 3, there are made various samples (first to thirteenth embodiment examples (A-1 to A-13) and first to fourth comparison examples (B-1 to B-4)) with various settings of components and coating thickness of the resin coating layer 3 and various types of base surface roughness.

The change of the friction coefficient with time is measured as the test item. Specific conditions for the test are as follows.
Test Time: 6 hours
Test Specific Load: 10 MPa
Rotational Speed: 1300 rpm
Feed Oil Temperature: normal temperature
Shaft: quenched S45C
Lubricant: 5-W-30
Bearing Size: outer diameter 56 mm, width 18 mm, thickness 1.5 mm The table in FIG. 3 shows the first to thirteenth embodiment examples (A-1 to A-13) as examples, in which the average coating thickness t of the resin coating layer 3 is in a range from 1.0 μm to 5.0 μm (1.0 μm≤t≤5.0 μm), and a ratio of the reduced peak height Rpk to the average coating thickness t is in a range from 0.06 to 5.04 (0.06≤Rpk/t≤5.04). When the average coating thickness t is equal to or greater than 1.0 μm, the resin coating layer 3 can be easily formed with uniform thicknesses on the bearing alloy layer 2.

Also, there are shown the first to fourth comparison examples (B-1 to B-4), in which at least one of the average coating thickness t and the ratio of the reduced peak height Rpk to the average coating thickness t falls outside the above ranges.

Time necessary for the friction coefficient to stabilize (friction coefficient stabilization time) is measured as an index for the time necessary for the completion of the conformity for respective embodiment examples and comparison examples. Also, the resulting friction coefficients (final friction coefficients) are measured for respective embodiment examples and comparison examples.

The item "uniformity of coating thickness" in FIG. 3 indicates a mark "O" when the actual measurement value T of the coating thickness of the resin coating layer 3 falls in a range of t−2σ≤T≤t+2σ and indicates a mark "X" when the actual measurement value T falls outside the above range.

As shown in FIG. 3, in the first to thirteenth embodiment examples (A-1 to A-13), the friction coefficient stabilization time is relatively short (2.3 hours on average), and also, the final friction coefficient is relatively low (0.00035 on average). In contrast, the comparison examples even include an example (the fourth comparison example B-4), in which the friction coefficient is not stabilized. Even in other comparison examples, in which the friction coefficient is stabilized, the friction coefficient stabilization time is relatively long (4.7 hours on average) and the final friction coefficient is relatively high (0.00063 on average). Therefore, it is shown that the configuration of the present invention, in which the average coating thickness t of the resin coating layer 3 falls within the above-described range and the ratio of the reduced peak height Rpk to the average coating thickness t falls within the above-described another range respectively, improves the conformability of the slide bearing 10 and reduces the friction coefficient.

Furthermore, in the first to fifth embodiment examples (A-1 to A-5) among the first to thirteenth embodiment examples (A-1 to A-13), the average coating thickness t of the resin coating layer 3 is in a range from 2.0 μm to 4.5 μm (2.0 μm≤t≤4.5 μm), and the ratio of the reduced peak height Rpk of the resin coating layer 3 to the average coating thickness t is in a range from 0.1 to 2.0 (0.1≤Rpk/t≤2.0). An average friction coefficient stabilization time in the first to fifth embodiment examples (A-1 to A-5) is 1.2 hours, and an average value of the final friction coefficients in the first to fifth embodiment examples (A-1 to A-5) is 0.00028. Thus, the results in the first to fifth embodiment examples (A-1 to A-5) outperform the average values in the first to thirteenth embodiment examples (A-1 to A-13).

The influence of other parameters is also studied in the sixth to thirteenth embodiment examples (A-6 to A-13), in which it is considered that the influence of the average coating thickness t of the resin coating layer 3 and the influence of the ratio of the reduced peak height Rpk to the average coating thickness t are relatively similar. For example, the difference in pitches measured between the protrusion sections as an index of approximation between the recess-and-protrusion shape of the inner peripheral surface of the bearing alloy layer 2 and the recess-and-protrusion shape of the resin coating layer 3 is equal to or less than 0.05 mm (|Rsma−Rsmr|≤0.05 mm) in the sixth to eleventh embodiment examples (A-6 to A-11). In the same embodiment examples, the distance Δ measured in the axial direction between the protrusion section on the inner peripheral surface of the bearing alloy layer 2 and the closest protrusion section of the resin coating layer 3 is equal to or less than one third of the pitch Rsma of the protrusion section of the bearing alloy layer 2 (Δ≤Rsma/3). The sixth to eleventh embodiment examples (A-6 to A-11) have a relatively short friction coefficient stabilization time on average compared with the twelfth and thirteenth embodiment examples (A-12, A-13), in which the difference in pitches and the distance Δ are different from the above value ranges. The average value of the friction coefficient stabilization time in the sixth to eleventh embodiment examples (A-6 to A-11) is 2.8 hours while the average value of the friction coefficient stabilization time in the twelfth and thirteenth embodiment examples (A-12, A-13) is 3.8 hours. The sixth to eleventh embodiment examples (A-6 to A-11) have a relatively low final friction coefficient on average compared with the twelfth and thirteenth embodiment examples (A-12, A-13). The average value of the final friction coefficient in the sixth to eleventh embodiment examples (A-6 to A-11) is 0.00038 while the average value of the final friction coefficient in the twelfth and thirteenth embodiment examples (A-12, A-13) is 0.00040.

As above, it is confirmed that the time required for completing the conformity is shortened when the bearing alloy layer 2 and the resin coating layer 3 are formed such that each parameter falls within the respective range defined in the present invention. Also, in the first to thirteenth embodiment examples (A-1 to A-13), it is confirmed that the friction coefficient is successfully lowered.

Figure 4:
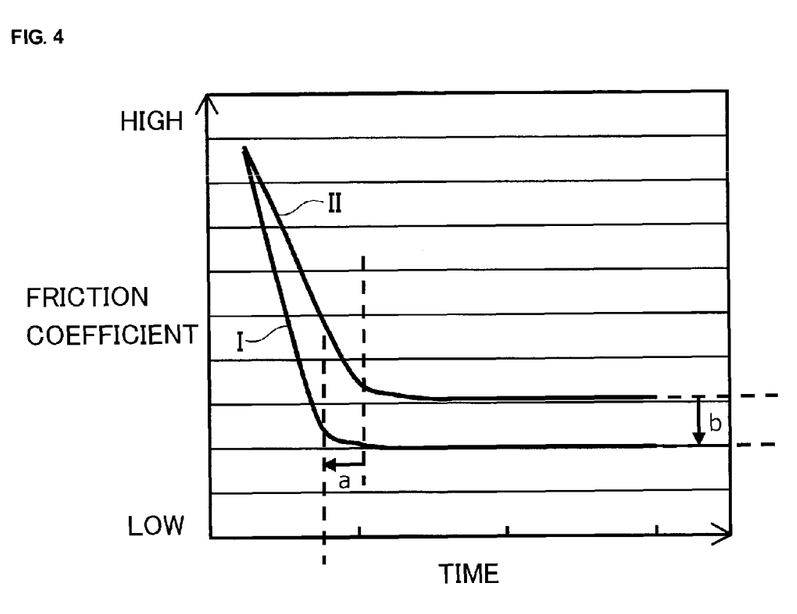
FIG. 4 is a comparison diagram of change of the friction coefficient of the internal combustion engine slide bearing with time between a case of the internal combustion engine slide bearing according to one embodiment example of the present invention and a case of the internal combustion engine slide bearing of one comparison example.

FIG. 4 illustrates an outline of the change of the friction coefficient with time during the initial conformity about an embodiment example and a comparison example. A solid line I indicates the change in the embodiment example, and a solid line II indicates the change in the comparison example. In the above, the embodiment example indicates a case, in which all of the average coating thickness t, the ratio Rpk/t of the reduced peak height Rpk to the average coating thickness t, and the conditions of approximation between the recess-and-protrusion shape of the inner peripheral surface of the bearing alloy layer 2 and the recess-and-protrusion shape of the resin coating layer 3 fall within the ranges defined in the present invention. For example, the following conditions are satisfied in the embodiment example: 1.0 μm≤t≤5.0 μm; 0.06≤Rpk/t≤5.04; t−2σ≤T≤t+2σ; |Rsma−Rsmr|≤0.05 mm; and Δ≤Rsma/3. In contrast, the comparison example indicates another case that does not satisfy at least one of "1.0 μm≤t≤5.0 μm" and "0.06 Rpk/t≤5.04" among the above conditions. As shown by an arrow a in FIG. 4, the embodiment example completes the conformity in a shorter period of time than the comparison example. Also, as shown by an arrow b in FIG. 4, it is appreciated that the resulting friction coefficient after the completion of the conformity in the embodiment example is lower than that in the comparison example. FIG. 4 shows the advantageous effects of the present invention that the conformability is improved and the friction coefficient is successfully lowered.

The bearing alloy layer 2 is made of an aluminum alloy in the above embodiment. Alternatively, the bearing alloy layer 2 may be made of a copper alloy or a tin alloy having Vickers hardness equal to or greater than 30.

The resin coating layer 3 may have particles added thereto, such as calcium phosphate, magnesium phosphate, barium phosphate, lithium phosphate, tribasic lithium phosphate, tribasic calcium phosphate, calcium hydrogen phosphate, magnesium hydrogen phosphate, lithium pyrophosphate, calcium pyrophosphate, magnesium pyrophosphate, lithium metaphosphate, calcium metaphosphate, magnesium metaphosphate, lithium carbonate, magnesium carbonate, calcium carbonate, strontium carbonate, calcium sulfate, barium sulfate, barium carbonate, titanium oxide, iron(III) oxide, carbon fluoride, ultra-high molecular weight polyethylene, sericite, and stannic sulfide.

As pretreatment before forming the resin coating layer 3, the bearing alloy layer 2 may be processed through surface roughening treatment by shot blasting, surface modification treatment by alkali and the like, ultra-fine recess-and-protrusion treatment by chemical etching, chemical conversion treatment, primer treatment, corona discharge treatment or the like.

The method for forming the resin coating layer 3 is not limited to spray coating but may be roll coating.

In a case where the inner peripheral surface of the slide bearing 10 has an oil groove formed to extend in the circumferential direction or in the axial direction, a resin coating layer may also be formed within the oil groove alternatively.

The present invention is not limited to the above description of the each aspect and the embodiment. The present invention includes various modifications provided that the modifications are within the scope of claims and would be easily thought of by those skilled in the art. The entire contents clearly described in the present specification such as patent application publications are incorporated herein by reference.

What is claimed is:

1. A slide bearing for an internal combustion engine comprising:
    a metal layer having an inner peripheral surface formed to extend along at least a part of a cylindrical shape; and
    a resin coating layer formed on the inner peripheral surface of the metal layer, wherein:
        the inner peripheral surface of the metal layer has annular or helical groove sections that extend in a generally circumferential direction of the cylindrical shape such that the inner peripheral surface has protrusion sections, which are arranged adjacent to each other in an axial direction of the cylindrical shape and which extend in the generally circumferential direction;
        the resin coating layer is formed to match shapes of the groove sections and the protrusion sections; and
    t and Rpk satisfy the following relations:

$1.0\ \mu m \le t \le 5.0\ \mu m$; and $0.06 < Rpk/t < 5.04$, where t is an average coating thickness of the resin coating layer at positions different from crests of the protrusion sections; and
    Rpk is a reduced peak height of the resin coating layer.

2. The slide bearing according to claim 1, wherein:
the average coating thickness t and the reduced peak height Rpk of the resin coating layer satisfy the following relations:

$2.0\ \mu m \le t \le 4.5\ \mu m$; and $0.1 \le Rpk/t \le 2.0$.

3. The slide bearing according to claim 1, wherein:
T, t and $\alpha$ satisfy the following relation:

$t - 2\alpha \le T \le t + 2\alpha$, where $\alpha$ is a standard deviation of coating thicknesses of the resin coating layer measured at the positions different from the crests of the protrusion sections; and
    T is an actual measurement value of the coating thickness;
Rsma and Rsmr satisfy the following relation:

$|Rsma - Rsmr| \le 0.05$ mm, where Rsma is an average length measured between the adjacent protrusion sections on the inner peripheral surface of the metal layer; and
    Rsmr is an average length measured between corresponding adjacent protrusion sections of the resin coating layer, which correspond to the protrusion sections of the metal layer; and
Rsma and $\Delta$ satisfy the following relation:

$\Delta \le Rsma/3$, where $\Delta$ is a distance measured in the axial direction between one of the protrusion sections on the inner peripheral surface of the metal layer and a corresponding one of the protrusion sections of the resin coating layer, the corresponding one being positioned closest to the one of the protrusion sections of the metal layer.

4. The slide bearing according to claim 1, wherein:
the resin coating layer has a scratch resistance in a range of 500 MPa to 2000 MPa.

5. The slide bearing according to claim 1, wherein:
the resin coating layer contains a base resin and a solid lubricant;
the base resin contains polyamide-imide and polyamide, the polyamide corresponds to 2 to 20% of the polyamide-imide by volume;
the solid lubricant contains one or more of molybdenum disulfide, tungsten disulfide, boron nitride, and graphite; and
the solid lubricant, in total, corresponds to 20 to 60% of an entirety of the resin coating layer by volume.

* * * * *